United States Patent
Gage et al.

(10) Patent No.: US 6,549,162 B1
(45) Date of Patent: Apr. 15, 2003

(54) METHOD AND APPARATUS FOR TRANSMITTING REAL TIME DATA FROM AIRCRAFT TO GROUND STATIONS USING A DATA PROTOCOL OVER A SATELLITE SYSTEM

(75) Inventors: Kenneth Gage, Glendale, AZ (US); John Mortensen, San Diego, CA (US)

(73) Assignee: Qualcomm, Inc., San Diego, CA (US)

( * ) Notice: Subject to any disclaimer, the term of this patent is extended or adjusted under 35 U.S.C. 154(b) by 0 days.

(21) Appl. No.: 10/003,222

(22) Filed: Oct. 29, 2001

Related U.S. Application Data
(60) Provisional application No. 60/298,053, filed on Jun. 12, 2001.

(51) Int. Cl.[7] .............................................. H04B 7/185
(52) U.S. Cl. ................... 342/353; 342/357.16; 455/428
(58) Field of Search ........................... 342/353, 357.16; 455/428

(56) References Cited

U.S. PATENT DOCUMENTS

| | | | |
|---|---|---|---|
| 6,240,074 B1 | * | 5/2001 | Chandos et al. ............. 370/321 |
| 6,243,580 B1 | * | 6/2001 | Garner ........................ 455/428 |
| 6,343,205 B1 | * | 1/2002 | Threadgill et al. .......... 455/428 |

* cited by examiner

*Primary Examiner*—Theodore M. Blum
(74) *Attorney, Agent, or Firm*—Philip R. Wadsworth; Gregory D. Ogrod

(57) ABSTRACT

Provided is a system and method for providing data originating from an aircraft to a ground-based device using a satellite communications link. The system includes an aircraft-based transceiver to transmit the data to a satellite. The data is associated with the operation of a particular aircraft. Also included is a ground-based receiver to receive the data transmitted from the aircraft-based transceiver through a communications link established by the satellite.

7 Claims, 5 Drawing Sheets

DATA TRANSMIT MODULE

METHOD AND APPARATUS FOR TRANSMITTING REAL TIME DATA FROM AIRCRAFT TO GROUND STATIONS USING A DATA PROTOCOL OVER A SATELLITE SYSTEM

This application claims the benefit of Provisional application No. 60/298,053 filed Jun. 12, 2001.

BACKGROUND OF THE INVENTION

I. Field of the Invention

This invention generally relates to the field of communications. More particularly, the present invention relates to a system and technique to transmit aircraft related data from an aircraft to a ground location using a satellite communications link.

II. Related Art

In-flight commercial aircraft are limited in their ability to transmit real-time data to locations external to the aircraft. Real-time data may be defined as data associated with the aircraft's current flight, including audio and video information. This is especially significant in relation to aircraft flight data and cockpit voice data. Presently, for example, aircraft flight and cockpit voice data are not transmitted live. Instead, the data are recorded into storage devices known as black boxes. If available, real-time aircraft flight and cockpit voice data could be especially useful for in-flight performance analysis and to maintain optimal aircraft flight performance. It would also be useful for post flight analyses, such as aircraft accident investigations. More importantly, the collection of real-time aircraft flight and cockpit voice data by ground locations would preclude the need to retrieve the aircraft's black boxes before the accident investigation could begin. Currently, before the investigation commences, the black boxes must be retrieved and the aircraft data, stored therein, must be downloaded for analysis.

In the aircraft-based data recording system described above, the aircrew uses an intercom system for communication within the cockpit. Conversations in the cockpit may be captured by a number microphones, such as an ambient microphone located in the aircraft's instrument panel or bulkhead, or by a microphone located in any of the headsets located in the cockpit. These conversations are forwarded over the intercom system to a cockpit voice recorder and to other aircraft related systems, such as the aircraft's cabin. Similarly, data related to aircraft flight systems, such as avionics control, hydraulics, and electronics data, are recorded by the flight data recorder. The cockpit voice and the flight data recorder are the black boxes referred to above. In the event of aircraft flight anomalies, the black boxes must be physically retrieved before their data can be analyzed. The need to retrieve the black boxes often forestalls aircraft accident investigations.

Other systems are capable of transmitting aircraft performance data and aircrew cockpit voice data from an in-flight aircraft directly to a ground monitoring/collection facility. However, transmissions from these systems are usually limited in range and the aircraft must normally maintain a line-of-sight with the collection facility. These other systems are therefore ineffective to use for performing in-flight analysis of live data transmitted from an aircraft that may be significant distances from the collection facility.

As a result, there is a need for a system and method to transmit live flight and voice data from commercial aircraft to ground collection stations regardless of line-of-sight and/or the distance between the aircraft and the ground collection station.

SUMMARY

Consistent with the principles of the present invention as embodied and broadly described herein, the invention is directed to a system configured to provide data originating from an aircraft to a ground-based device through a satellite communication link. The system comprises an aircraft-based transceiver configured to transmit the data, the data being associated with aircraft operation. Also included is a ground-based receiver configured to receive the data transmitted from the aircraft-based transceiver via the satellite communication link.

Features and advantages of the present invention include an ability to analyze live data related to key aircraft functions at any time during the aircraft's flight. Such an ability is especially useful in commercial aircraft applications. The system and method provide appropriate aircraft personnel, such as maintenance crews, with an ability to monitor key aircraft functions and detect anomalies that may jeopardize the safety of the aircraft. Maintenance crews can then suggest techniques to mitigate the anomalies and send related instructions to the aircrew. Also, such a system and method is particularly useful during crash investigations. Since the live data is available to ground facilities in near real-time, accident investigations could begin immediately. Retrieval of the black boxes would no longer be necessary.

BRIEF DESCRIPTION OF THE DRAWINGS

The accompanying drawings, which are incorporated in and constitute a part of the specification, illustrate an embodiment of the invention and, together with the description, explain the purpose, advantages, and principles of the invention. In the drawings.

DETAILED DESCRIPTION

The following detailed description refers to the accompanying drawings that illustrate exemplary embodiments consistent with this invention. Other inventions are possible and modifications may be made to the embodiments without departing from the spirit and scope of the invention. Therefore, the following detailed description is not meant to limit the invention. Rather the scope of the invention is defined by the appended claims.

It would be apparent to one of skill in the art that the various components presented herein and described below may be implemented in many different embodiments of hardware, software, and/or firmware in the entities illustrated in the figures. The actual software code or specialized controlled hardware used to implement the present invention is not limiting of the present invention. Thus, the operation and behavior of the present invention will be described with the understanding that modifications and variations of the embodiments are possible, given the level of detail present herein.

Figure 1:
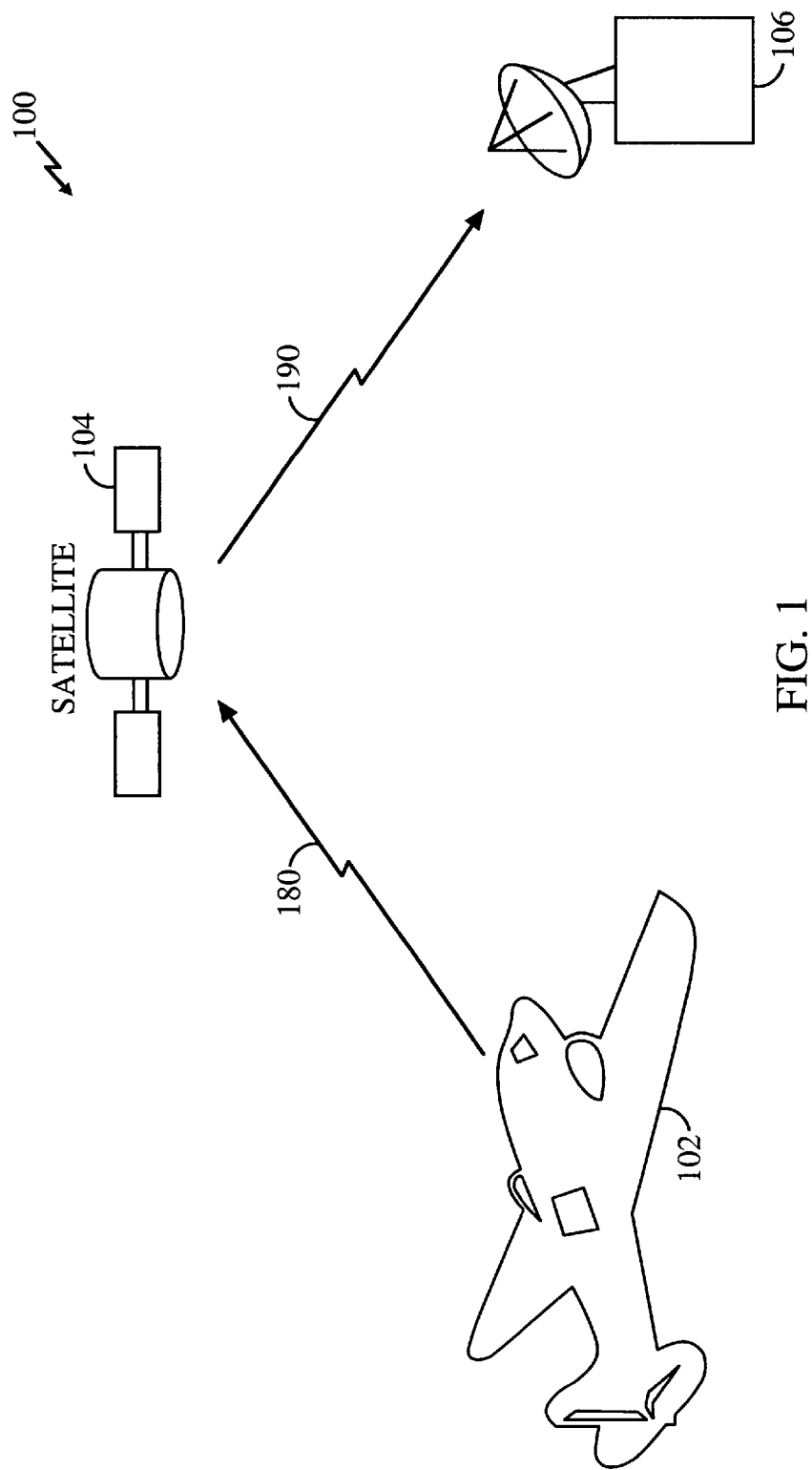
FIG. 1 is a functional block diagram illustrating an aircraft-based communications system, a satellite link, and a ground-based communications system in accordance with one embodiment of the present invention.

FIG. 1 illustrates an exemplary communications network 100 constructed and arranged in accordance with one embodiment of the present invention. The communications network 100 includes an aircraft-based communications system 102, a satellite 104, a ground-based system 106, along with an uplink 180 and a downlink 190.

Figure 2:
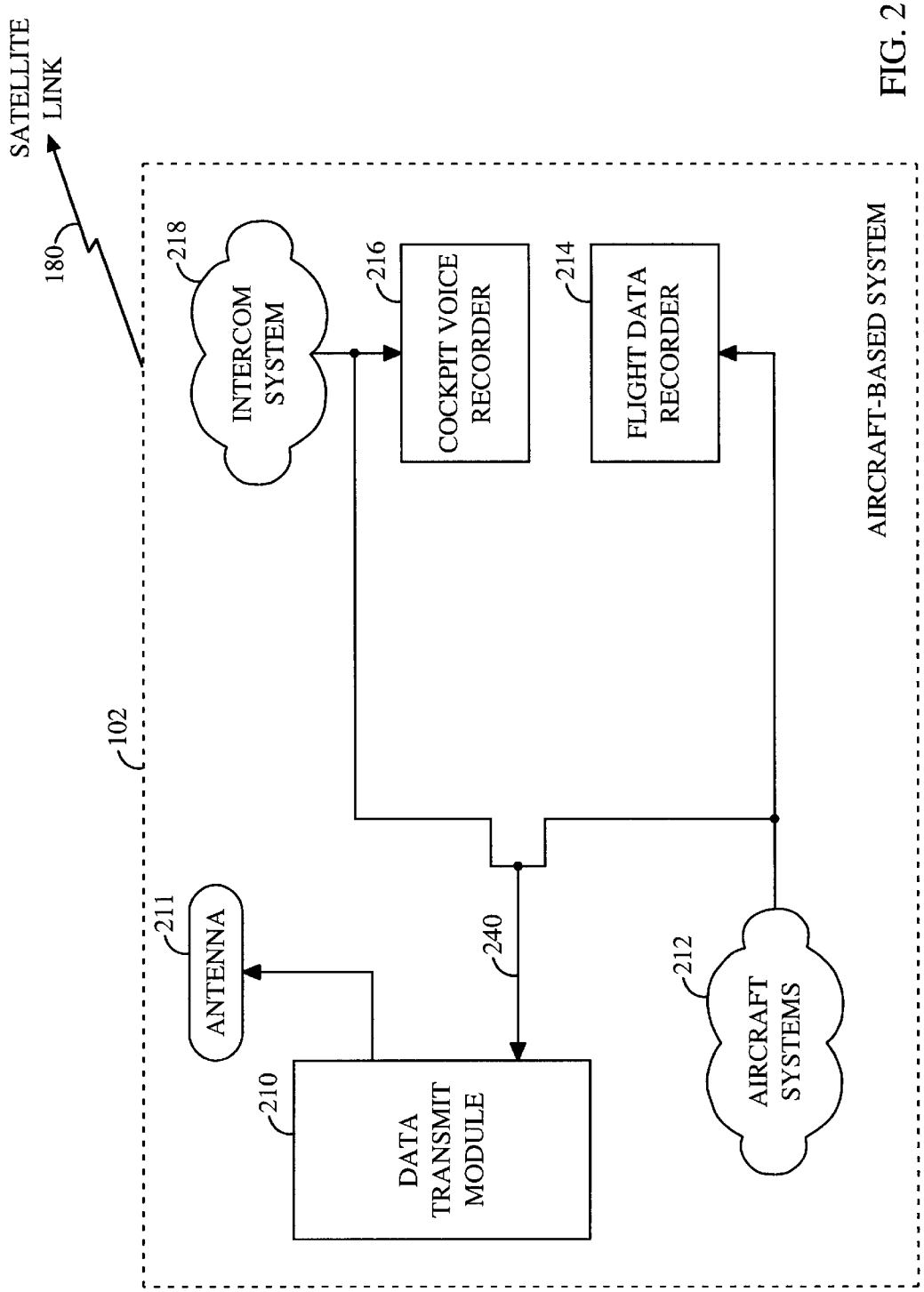
FIG. 2 is an expanded view of the aircraft-based communications system of FIG. 1.

FIG. 2 provides a more detailed view of the aircraft-based communications system 102 of FIG. 1. The aircraft-based system 102, in one embodiment, includes aircraft flight systems 212, a flight data recorder 214, a cockpit voice recorder 216, and an aircraft intercom system 218. In the aircraft-based system 102, live data from the aircraft systems 212 is provided to the flight data recorder 214 and live data from the intercom system 218 is provided to the cockpit voice recorder 216. In the present invention, however, the live data is also supplied to a data transmit module 210 in the form of a data stream 240.

The data stream 240 may include information from the cockpit voice recorder 216 and the flight data recorder 214 structured and formatted in accordance with known techniques necessary to facilitate their transmission to the data transmit module 210. The data stream 240 could include analog or digital data transmitted at standard transmission rates. For example, if the data stream 240 is provided to the data transmit module 210 in a serial format, an exemplary data rate of about 19.2 Kbs would be adequate. The data transmit module 210 may be, for example, a transceiver. Also included in the aircraft-based system 102 is an antenna 211 coupled to an output of the data transmit module 10 to wirelessly transmit the data stream 240 via the uplink 212.

Figure 3:
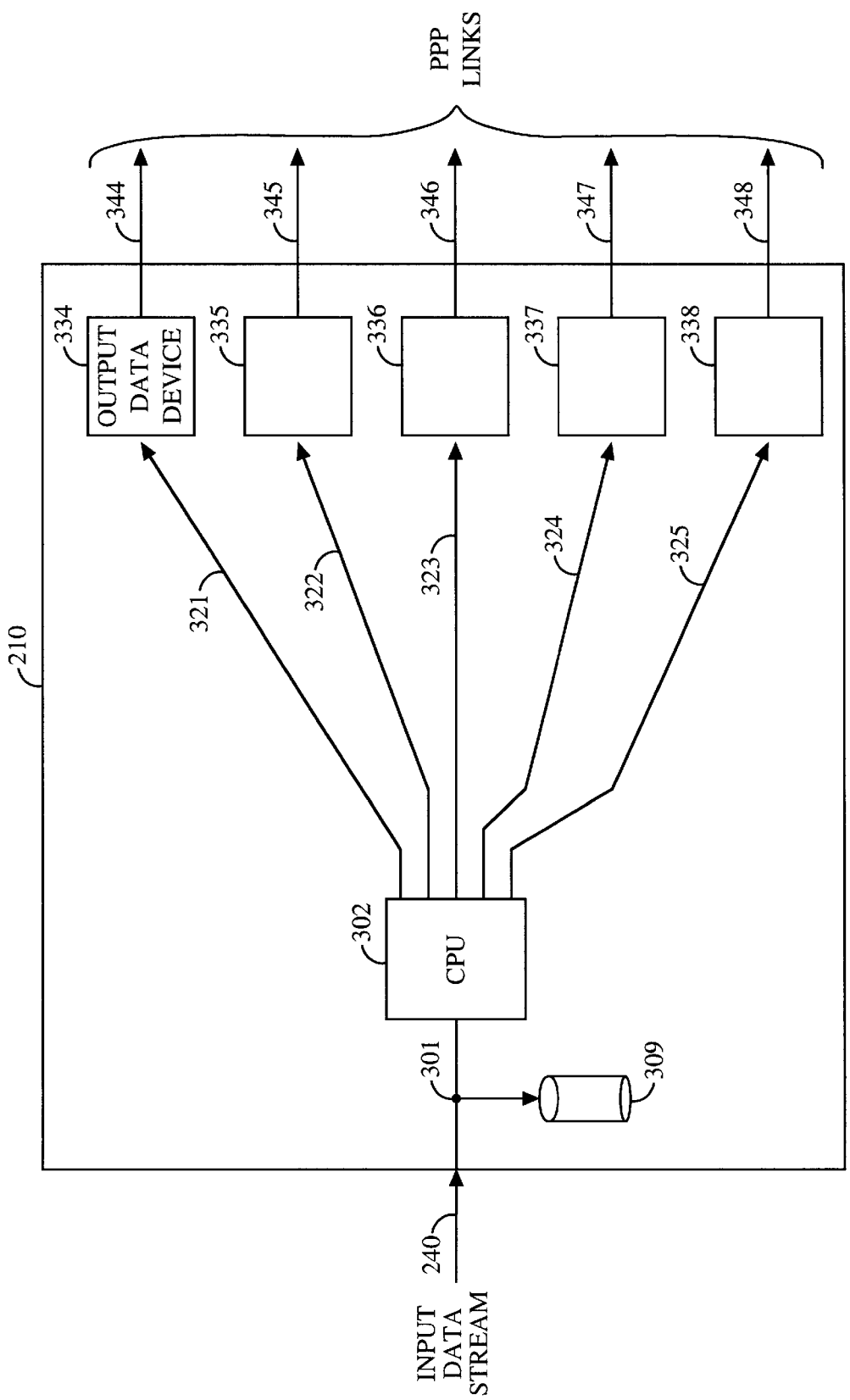
FIG. 3 is a functional block diagram of a data transmit module in accordance with an embodiment of the present invention.

FIG. 3 illustrates an exemplary embodiment of the data transmit module 210 constructed and arranged in accordance with the present invention. The input data stream 240 is received by the data transmit module 210 at an input port 301. The data transmit module 210 also includes a central processing unit (CPU) 102, which controls the operation of the data transmit module 210 when data streams are received at the input port 301. After being received at the input port 301, the data is forwarded along parallel paths to both the CPU 302 and a storage device 309. The CPU 302 may be based upon any operating system. However, in a preferred embodiment of the present invention, the CPU 302 is UNIX based. The CPU 302 functions as an internal data router for the data transmit module 210. In the present embodiment, the CPU 302 also divides the input data stream 240, or data packet, into a number of smaller data segments 321–325. This process is known in the art as data fragmenting. Data fragmenting is advantageous when a large data packet requires rapid transmission in a bandwidth limited environment. Data fragmenting permits a user to fragment the larger data packet and transmit the resulting smaller fragments over multiple data paths near simultaneously. This near simultaneous transmission of the smaller fragments, across multiple paths, can be accomplished more quickly than transmission of the larger packet across a single path.

When the input data stream 240 is fragmented, the individual data fragments 321–325 are each assigned to separate output data channels, each corresponding with an output data device within the data transmit module 210. In particular, output data devices 334–338 respectively correspond with data fragments 321–325. The output data devices 334–338 produce data paths 344–348, each establishing a point-to-point protocol (PPP) link for transmission across the communications network 100. In accordance with network protocol standards, each of the data fragments 321–325 is individually encoded by the CPU 302 such that when they are received by a ground receiver, the data fragments 401–405 may be recombined into a single data segment. This process is explained in greater detail below.

Next, the data fragments 321–325 are transmitted through output data devices 334–338 respectively, and are routed across PPP links 344–348 for transmission through the aircraft antenna 211, as shown in FIG. 2. The PPP links 344–348 are forwarded to the ground based system 106 by first establishing the uplink 180 with the satellite 104. The satellite 104 may represent, by way of example, a communication node of a Low Earth Orbit (LEO) communications satellite system.

Figure 4:
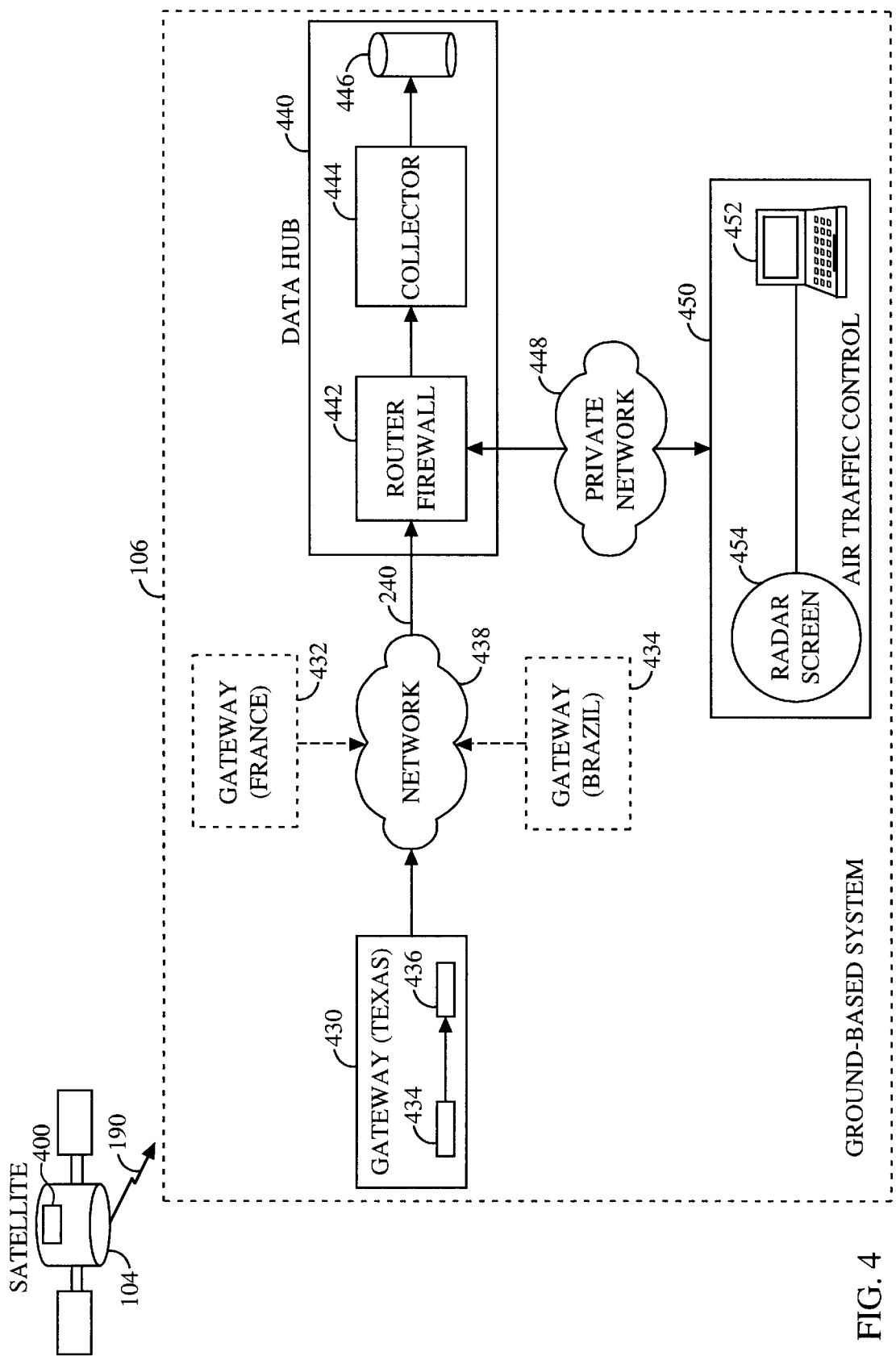
FIG. 4 is an expanded view of the satellite link and the ground-based communications system shown in FIG. 1.

As shown in FIG. 4, the satellite 104 includes at least a satellite transceiver 400 in order to receive the data transmitted across the uplink 180. Upon receiving this transmitted data, the satellite transceiver 400 establishes a downlink 190 with the ground-based system 106. Conventional satellite communications networks include ground based receiver stations, sometimes referred to as gateways. In one embodiment, the gateway is physically located in Texas, as in the case of gateway 430. Gateways may be located at disparate terrestrial locations such as a gateway 432 located in France, and a gateway 434 located in Brazil. The gateway 430 includes a receiver 301 for receiving the downlink 190 transmitted from the satellite transceiver 400.

Figure 5:
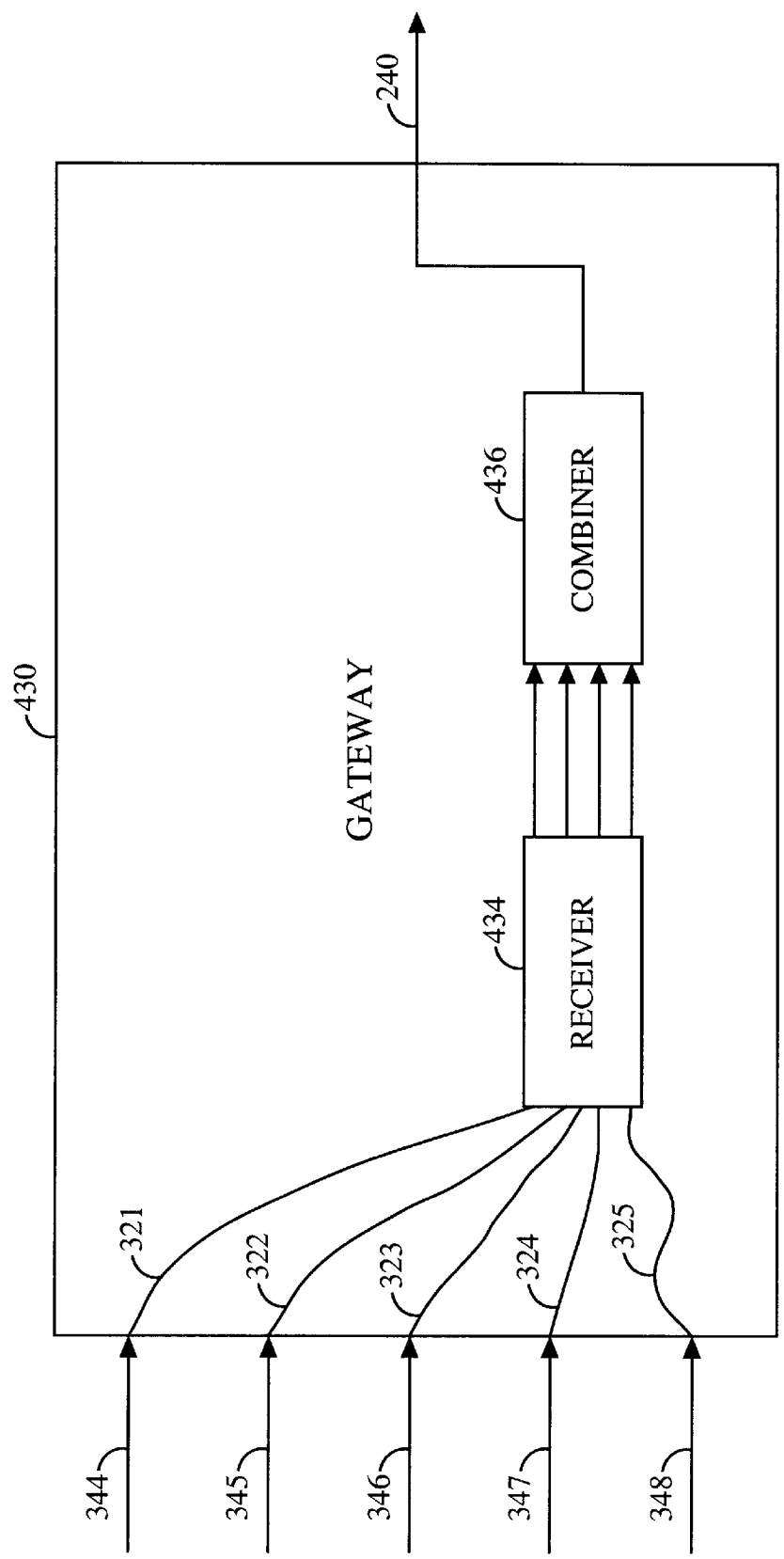
FIG. 5 is a functional block diagram illustrating a gateway used in a satellite network as used in the present invention.

FIG. 5 illustrates a gateway device constructed and arranged in accordance with an exemplary embodiment of the present invention. As shown, each of the PPP links 344–348 is wirelessly transmitted across the communications network 100 by the data transmit module 210 and received in the gateway device 30. The fragmented data segments 321–325 received by the receiver 434 are output to a combiner 302, where the fragments 321–325 are recombined to form a single data stream.

During system operation, the satellite communications network 100 is governed by standard network protocols, such as the transmission control protocol/Internet protocol (TCP/IP). TCP/IP governs the manner in which data segments are established, identified, fragmented, transmitted, received, and recombined. In one embodiment, the CPU 302 of the data transmit module 210 assigns each of the fragments 401–405 a unique IP address. Therefore, when the data fragments 401–405 are transferred using the PPP links 344–348, each has its own unique identification and IP, or destination address. Consequently, when the data fragments 321–325 are received in the gateway 430, each can be identified based upon their unique TCP/IP identification and IP address.

Since the identification of each fragment is known, the data fragments 321–325 may be recombined in the precise sequence of their position in the original input data stream 240 received at the input port 301 of the data transmit module 210. Having now been recombined to form the original data stream 40, the gateway 430 may provide the single data stream 240 to a standard ground-based network 438. The network 438 may include, for example, the Internet, a priority network, a dial-up link, or any other suitable computer based communications network. Similarly, had the aircraft been positioned to downlink data to the gateway 432 located in France, or the gateway 434 located in Brazil, each of these gateways would perform the required recombining of the data fragments 401–405 to produce the original data stream 240 and provide the data stream 240 to the network 438. The network 438 may be used to forward the data stream 240 to a data hub 440 for additional routing.

The data hub 440 may include a router/firewall 442, a collector 444, and a storage device 446. The firewall 360, in accordance with standard data security practices, prevents the unauthorized extraction or use of the data stream 240. The collector 444 may serve as a collection node for an interested organization such as the Federal Aviation Administration (FAA) in order to establish and analyze historical records of aircraft flight data and cockpit voice data. The collector 444 may then store this data in the storage device 446.

To analyze the live data while the aircraft is still in flight, another private network 448 is provided. The private network 448 may be linked, for example, to an air traffic control tower 450 where an air traffic controller may view electronic representations of all aircraft on a radar screen 454. The controller also has the option of analyzing these representations using a data analysis device, such as a laptop computer 452. Thus, during the aircraft's flight, the aircraft controller, after recognizing a particular aircraft on the radar screen 454, is able to download live aircraft flight control data and cockpit voice data associated with the particular aircraft. This information may then be processed in near real-time for flight operation purposes.

The operation of the communications network 100 will now be described in greater detail below. The network 100 can be initiated for data extraction and analysis purposes during any period of an aircraft's flight. For example, the system can be activated during time periods traditionally considered most problematic, such as takeoffs and landings. Specifically, the system can be initialized during aircraft take-off or when aircraft power is initially activated.

When the communications network 100 is activated, data from the intercom system 218 and the aircraft systems 212, shown in FIG. 2, are transmitted in the form of the data stream 240 to the data transmit module 210. Typical LEO satellites orbit the earth in overlapping geosynchronous patterns to form a satellite network. Such satellite networks, however, may have gaps in satellite coverage. Live data cannot be transmitted when these coverage gaps occur. Therefore, the live data must be stored at least for brief periods of time in the storage device 309. With the exception of coverage gaps, the system 100 can operate continuously, i.e., transmitting and receiving live data throughout the entire period from the aircraft's takeoff to the aircraft's landing.

Alternatively, the system could operate on an on-demand basis, thus only transmitting data upon the request of a system operator. In this mode, whenever live data is not being requested, it may be stored in the storage device 309. Due to an aggregation of data collected during coverage gaps and the on-demand mode of operation, the data storage device 309 may contain comparatively large segments of data. When the coverage gap disappears, for example, the system will need to transmit all of this stored data as quickly as possible. Generally, this must happen before transmissions of live data can resume. Therefore, the system 100 will need to transmit data at much faster rates than normally required.

To accommodate the requirement for faster rates of transmission, the CPU 302 fragments the data stream 240 into the smaller data fragments 321–325. The fragments 321–325 are then transmitted substantially simultaneously. Each fragment includes a unique ID and an IP address and is respectively provided to output devices 334–338 for parallel transmission. As known in the art, the PPP links provide the necessary protocols and standards to properly encapsulate each of the data fragments 321–325 for transmission across the satellite uplink 180. The receiver 400 of the satellite 104 receives the uplink 180 and establishes the downlink 190 with the ground-based system 106. As discussed above, the gateway 430 includes the receiver 301 and the combiner 302, which respectively receive the data fragments 321–325 and recombine the fragments in accordance with TCP/IP principles.

The gateway 430, connected by communication link to the network 438, provides a path for the data to be routed to the data hub 440. With use of the data hub 440, Federal Aviation Administration (FAA) computers may monitor the recombined data stream 240, or data segments from other aircraft, for flight anomalies. That is, predetermined thresholds may be established for critical flight parameters. Once the actual flight data is received across the communication system 100, it can be automatically analyzed. If the analysis reveals that the data exceeds the predetermined thresholds, a flag may be set in the system to request human intervention in association with the associated aircraft's flight.

Alternatively, the present invention could be used to enable any aircraft controller to call up, on-demand, cockpit voice data and/or aircraft flight data associated with any aircraft observed on the radar screen 454 by using the analysis device 372. Although discussion of the present invention has focused on the merits of aircraft flight data and cockpit voice data, aircraft video and other forms of live information could also be accommodated in alternative embodiments.

The foregoing description of the preferred embodiments provide an illustration and description, but is not intended to be exhaustive or to limit the invention to the precise form disclosed. Modifications and variations are possible consistent with the above teachings or may be acquired from practice of the invention. Thus, it is noted that the scope of the invention is defined by the claims and their equivalence.

What is claimed is:

1. A method for providing information associated with aircraft operation using a communication system including at least one aircraft-based data output device, an aircraft-based transceiver coupled to the data output device, and a ground-based receiver, the aircraft-based transceiver being configured to connect to the ground-based receiver via a satellite communication link, the method comprising:

transmitting data signals associated with operation of the aircraft from the data output device to the aircraft-based transceiver;

fragmenting the data signals into a plurality of data segments; and transmitting the plurality of data segments from the aircraft-based transceiver to the ground-based receiver via the satellite communication link, a first data segment of the plurality of data segments transmitted across a first communication path and a second data segment of the plurality of data segments transmitted near-simultaneously across a second communication path.

2. The method of claim 1 wherein the data signals associated with operation of the aircraft are selected from the group consisting of signals generated by a flight data device and signals generated by a cockpit voice device.

3. A system configured to provide data originating from an aircraft to a ground-based device through a satellite communication link, the system comprising:

an aircraft-based transceiver configured to transmit data associated with operation of the aircraft, said transceiver including a processor for fragmenting said data into a plurality of data segments, and for transmitting a first data segment of the plurality of data segments across a first communication path, and for transmitting a second data segment of the plurality of data segments near-simultaneously across a second communication path; and a ground-based receiver configured to receive the data transmitted from the aircraft-based transceiver via the satellite communication link.

4. The system of claim 3, wherein the data includes at least one of aircraft flight data, cockpit voice data, and aircraft video data.

5. The system of claim 3, wherein the aircraft-based transceiver, the ground-based receiver, and the satellite link form a communications network in accordance with a network protocol.

6. The system of claim 5, wherein the network protocol includes at least a transmission control protocol/internet protocol.

7. A communications system comprising:

an aircraft-based communication module including:

at least one data production device configured to produce data representative of an output from at least one from a group including aircraft flight data, cockpit voice data, and aircraft video data; and a data transmit module configured for receiving the data from the at least one data production device and for fragmenting said data into a plurality of data segments, and for transmitting a first data segment of the plurality of data segments across a first communication path, and for transmitting a second data segment of the plurality of data segments near-simultaneously across a second communication path;

a satellite network, the network including:

at least one low earth orbit satellite structured and arranged to receive the fragmented data transmitted from the data transmit module, the at least one low earth satellite being configured to retransmit the fragmented data; and a ground-based gateway configured to receive and recombine the fragmented data transmitted from the satellite;

an aircraft data analysis facility configured to receive recombined data from the gateway across a data network.

* * * * *